Aug. 25, 1959

E. JUSTI ET AL 2,901,523

DIRECT PRODUCTION OF ELECTRICAL ENERGY
FROM THE OXIDATION OF FLUID FUEL

Filed Feb. 9, 1956

INVENTOR
EDUARD JUSTI and AUGUST WINSEL

By Burger, Dinklager & Sprung.
ATTORNEYS

United States Patent Office 2,901,523
Patented Aug. 25, 1959

2,901,523

DIRECT PRODUCTION OF ELECTRICAL ENERGY FROM THE OXIDATION OF FLUID FUEL

Eduard Justi and August Winsel, Braunschweig, Germany, assignors to Ruhrchemie Aktiengesellschaft, Oberhausen-Holten, and Steinkohlen-Elektrizität Aktiengesellschaft, Essen-Ruhr, Germany, both corporations of Germany Application February 9, 1956, Serial No. 564,606

Claims priority, application Germany February 12, 1955

18 Claims. (Cl. 136—86)

This invention relates to new and useful improvements in the direct production of electrical energy from the oxidation of fluid fuel.

Fuel cells for directly obtaining electrical energy from a fuel gas or liquid and an oxidizing gas are known. These fuel cells have a fuel electrode and an oxygen electrode which are spaced apart from each other in an electrolyte bath as, for example, a potassium hydroxide solution. The electrodes may be, for example, in the form of hollow cylindrical porous bodies with an oxidizing agent being passed to the interior of one electrode and a fuel gas or liquid fuel being passed into the interior of the other electrode. The electrical energy is produced by the fuel being adsorbed in the pores of the fuel electrode and thereafter being de-adsorbed therefrom in the form of charged ions whereas the oxidizing gas is adsorbed and then de-adhorbed in the form of oppositely charged ions from the pores of the oxygen electrode. The two ions thereafter combine in the electrolyte leaving an electrical charge on the electrodes.

It is also possible to completely mix a liquid fuel with the electrolyte rather than passing the same through fuel electrode as is described in our co-pending application Serial No. 564,607 filed February 9, 1956.

Current densities of more than 500 milliamperes per square centimeter have been obtained with these fuel cells as, for example described in "Direct Current" page 34, 1952. The conventional fuel cells as described therein however, require relatively high operating temperatures of about 200° C. so that the vapor pressure of the concentrated potassium hydroxide electrolyte solution used is about 27 atmospheres. The construction of the cells to withstand such pressures involves considerable complications, operational hazards and the material used and, in particular, the electrodes are subjected to severe corrosion by the hot alkali solutions within short periods of time.

In co-pending application, Serial No. 472,084 filed November 30, 1954, a fuel cell and in particular an electrode therefor is described which allows operation at temperatures of as low as room temperature thus overcoming the above-mentioned disadvantages. The electrode of the said co-pending application is of a shaped porous carbon body having, for example, a hollow cylindrical tubular shape and having an average pore diameter of 10 to 100 Angstrom units and an inner surface area of 10 to 50 square meters per gram. These electrodes are produced by rapidly heating a shaped carbon electrode body to a temperature above about 650° C. as, for example, a temperature between about 700 and 1000° C. and subsequently suddenly cooling the hot body as, for example, by quenching to a temperature below about 50° C. The electrode is excellently suited as a gas electrode in a fuel cell and particularly as an oxygen electrode.

In co-pending application, Serial No. 542,434 filed October 24, 1955, a double skeleton catalyst electrode is described for a fuel cell which is excellently suited as a gas diffusion electrode and preferably as a hydrogen electrode. This electrode has a carrier skeleton with metallic conductivity and contains 20 to 80% by weight of Raney catalyst skeleton granules embedded therein. The electrode is produced by pressing together powdered material such as carbon powder or lye-resistant metal powders which are capable of forming a sinterable mixture with powdered Raney alloy, together with a powdered Raney alloy under high pressures of between about 3,000 and 7,000 kilograms per square centimeter and thereafter sintering the mass at a temperature between about 600 and 1,000° C. The sintered mass is then contacted with lye to dissolve the aluminum from the Raney alloy forming a Raney catalyst. The Raney alloy is preferably a nickel alloy, with an inactive component such as silicon, magnesium, zinc, or preferably aluminum. In place of the nickel, cobalt or iron may be used, for example. The catalyst described is particularly well adapted for ionizing hydrogen in the fuel cell at temperatures as low as room temperatures and with the production of high current densities. The electrode further has a high mechanical strength and shows high thermal and electrical conductivity with a strong resistance to poisoning.

In the operation of fuel cells of the type described above in which the electrodes are positioned side by side in spaced relationship in the electrolyte bath, a decrease in the current density occurs during the operation of the cell.

One object of this invention is to prevent this current density decrease during the fuel cell operation.

A further object of this invention is a fuel cell of the above mentioned type which is capable of operating with a high initial current strength and without a decrease in the current strength during operation. These and still further objects will become apparent from the following description read in conjunction with the drawings in which.

In the operation of fuel cells, a continuous bubbling of gas from the oxygen electrode into the electrolyte may be noted. These gas bubbles at least in part represent an ionized oxygen.

In accordance with the invention it has been discovered that the decrease in the fuel cell activity during operation is due to the oxidation of the fuel electrode by these oxygen bubbles and that this decrease in activity may be prevented by maintaining the fuel electrode free from contact with these gas bubbles emerging from the oxygen electrode as, for example, by maintaining a perforated partition between the fuel electrode and oxygen electrode. The perforations through the partition must be smaller than the diameter of the small bubbles emerging in a non-ionized state through the fine holes, cracks or even pores of more than average size in the oxygen electrode. The perforations should thus be of a size of less than 1 millimeter and the partition is preferably in the form of a fine meshed wire gauze having a mesh size of less than 1 millimeter, still better less than 0.5 millimeter and preferably less than 0.1–0.02 millimeter. The fine mesh wire gauze should preferably be of a material having good electrical conductivity but if it is not essential to have an extremely low resistance to the propagation of the electric current then gauzes of non-conductive material such as plastics as, for example, polyamides or polystyrene may be used. It has been found particularly advantageous in accordance with the invention to use a fine mesh nickel gauze as is generally available in the chemical industry as a catalyst. Any other metal which is resistant to concentrated lye as, for example, stainless steel may also be used for this purpose. Moreover, gauzes of lye-resistant plastics such as polyethylene are usable. The materials preferably used as the electrolytes are concentrated solutions of alkali hydroxides.

Figure 2:
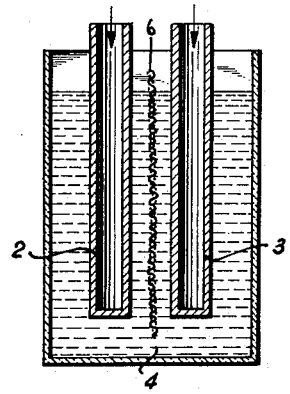
Fig. 2 is a diagrammatic vertical section of an embodiment of a fuel cell in accordance with the invention for utilization of a gaseous fuel.

An embodiment of a fuel electrode in accordance with the invention is shown in Fig. 2. The electrode consists of a container such as a glass container containing an electrolyte bath as, for example, a 6 normal KOH solution. Positioned side by side in spaced relation in the electrolyte bath is an oxygen electrode 2 and a gas fuel electrode 3.

The oxygen electrode 2 may have any conventional or known construction but preferably is in the form of a hollow cylindrical shaped carbon body having an average pore diameter of 10 to 100 Angstrom units and an inner surface area of between 10 and 50 square meters per gram. This electrode may be produced in accordance with my said co-pending application Serial No. 472,084 by heating a shaped carbon body to a temperature above about 650° C. and thereafter suddenly cooling the heated body to temperatures below 50° C. with one or several repetitions of this procedure.

The fuel electrode 2 is shaped as a hollow cylindrical body opened at one end and may have any construction conventionally known in connection with gas diffusion type fuel electrodes. The fuel electrode 3, however, is preferably a highly active hydrogen electrode of a double skelton construction as described in my said co-pending application Serial No. 542,434. This electrode has a carrier skeleton having metallic conductivity with 20 to 80% by weight of Raney catalyst skeleton granules embedded therein.

Between the fuel electrode and oxygen electrode, a perforated partition in the form of a fine mesh wire gauze 6 is positioned. The fine mesh wire gauze is preferably a neckel gauze having a mesh size of less than 1 millimeter.

In operation, an oxidizing gas such as air, oxygen or halogen, is passed into the hollow interior of the oxygen electrode 2 while the fuel gas, such as hydrogen, is passed into the interior of the fuel electrode 3. By the adsorption and de-adsorption as ions of the gases in the pores of the electrodes with the migration of the ions formed into the electrolyte the curent is generated by the fuel cell in the conventional manner with it being possible to take current taps from the electrodes in the conventional manner. With the presence of the fine mesh wire gauze 6 bubbles emerging from the oxygen electrode 2 cannot migrate to or contact the fuel electrode 3 so that the initial current strength of the cell is maintained even after prolonged periods of operation.

In place of the gaseous fuel which is passed to the interior of the fuel electrode 3 a liquid fuel may be used.

Figure 3:
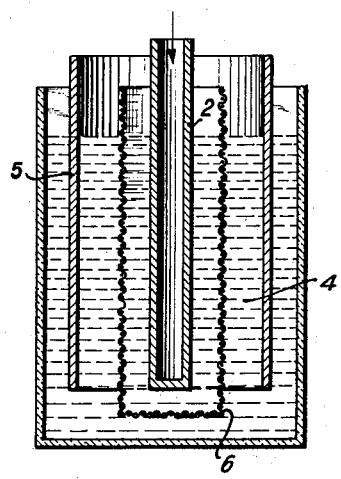
Fig. 3 is a diagrammatic vertical section of a further embodiment of a fuel cell in accordance with the invention for the utilization of a liquid fuel.

In place of passing the liquid fuel to the interior of the fuel electrode, the same may be simply mixed with the electrolyte as described in our co-pending application Serial No. 564,607, filed February 9, 1956. An embodiment of a fuel cell utilizing a liquid fuel admixed with the electrolyte is shown in Fig. 3. The electrolyte bath 4 is positioned in a container and has admixed therewith a liquid fuel as, for example, ethyl alcohol or ethyl acetate. An oxygen electrode 2 corresponding to the oxygen electrode 2 of Fig. 2 is positioned in the center of the electrolyte bath. As hollow bodies are not required as the fuel electrodes but solid electrodes such as sheets or rods will suffice, the fuel electrode 5 is in the form of a solid cylinder surrounding the oxygen electrode 2. This electrode may be a double skelton metal electrode as the electrode 3 of Fig. 2 or may, for example, be in the form of a sheet metal cylinder of a platinum metal such as Pt, Pd, etc. which is covered with platinum black. This metal cylinder which forms the negative electrode of the cell has a very low resistance to electrical propagation. In accordance with the invention the oxygen electrode 2 is surrounded by a cylindrically shaped sheet 6 of a fine mesh wire gauze, such as nickel gauze. In operation, as mentioned the fuel is admixed with the electroylte in the electrolyte bath 4 and oxygen is passed to the interior of the oxygen electrode 2. The oxygen bubbles emerging from the oxygen electrode 2 are prevented by the wire gauze 6 from contacting the fuel electrode 5 so that oxidation of the same cannot occur and the same has a very long life and the current produced by the cell does not decrease during operation.

It is, of course, possible to reduce the amount of unionized oxygen bubbling through the porous oxygen electrode by providing the same with as uniform a pore size as is possible. In practice, however, it is not possible to completely prevent the oxygen bubbling. In addition, fuel cells are generally operated with air as the oxidizing agent for reasons of economy. With the use of air which contains only about 20% of oxygen, it is only possible to ionize about 20% of the gas in the pores of the oxygen electrode while about 80% of the introduced gas escapes as small bubbles, predominantly consisting of nitrogen into the electrolyte. This nitrogen is not completely free of oxygen. Due to the flow of the electrolyte solution caused by the large quantity of nitrogen, the danger of the direct oxidation of the fuel electrode by residual oxygen in the nitrogen is particularly great. The invention is therefore of particular value to fuel cells which are operated with oxygen-containing gas mixtures such as air.

The following example is given to further illustrate the invention and to show the basis and effect thereof:

*Example 1*

Figure 1:
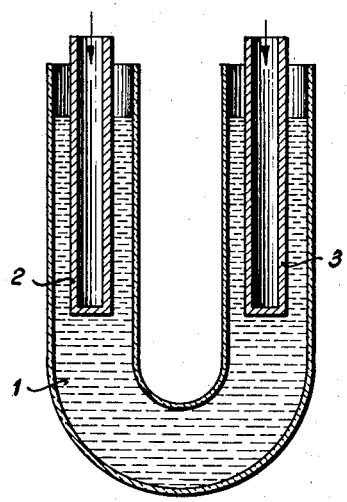
Fig. 1 is a diagrammatic vertical section of an experimental fuel cell set up to demonstrate the basis and effect of the invention.

A fuel cell arrangement as shown in Fig. 1 is set up. The arrangement consists of a U-shaped container having the electrolyte bath 1 with an oxygen electrode 2 in one leg of the U-shaped container and the fuel electrode 3 in the other leg of the U-shaped container. The electrolyte solution consists of a 6-normal KOH solution, the oxygen electrode 2 consists of a hollow cylinder of porous carbon having an average pore diameter of 10 to 100 Angstrom units and an inner surface area of 10 to 50 square meters per gram which has been formed by heating the shaped carbon body to temperatures above 650° C. and subsequently suddenly cooling the heated body to temperatures below 50° C. with one or several repetitions of this procedure. The fuel electrode 3 consists of a hollow cylindrical body formed as a double skeleton nickel electrode having a metallically conducting skeleton serving as a carrier with 20 to 80% by weight of Raney nickel catalyst granules embedded therein.

The electrolyte is maintained at temperatures up to 90° C. with air being passed to the interior of the oxygen electrode 2 and hydrogen being passed to the interior of the fuel electrode 3. The cell has a current density $i$ and an internal resistance $R_i$. The current density $i$ and the internal resistance $R_i$ remained extremely constant during prolonged periods of operation. A measurement of the different portions of $R_i$ showed, however, that the internal resistance resulting from the resistances of the two electrodes is relatively so small that the portion of the internal resistance attributable to the electrolyte path becomes important. This latter resistance may be designated as the ordinary resistance of propogation $R_A$ which equals $\mathfrak{s} \times 1/q$ where $\mathfrak{s}$ is the specific resistance in ohms per centimeter length of unit square centimeter cross section, 1 is equal to the length of the electrolyte path between the electrodes in centimeters, and $q$ is the cross section of the electrolyte path in square centimeters. It therefore follows that a reduction in the resistance to propogation $R_A$ could effect a considerable reduction of the total internal resistance $R_i$ and consequently an increase in the current density $i$ and of the efficiency, $E$. Since the specfic resistance of the electrolyte is constant the space 1 between the electrodes must therefore be reduced and the cross section of the electrolyte between the electrodes enlarged as much as possible in order to obtain the smallest resistance to propogation $R_A$.

If the electrodes 2 and 3 of Fig. 1 are then placed in a beaker containing the electrolyte solution corresponding exactly to Fig. 2 except with the wire gauze 6 removed, the electrolyte path between the electrodes is considerably shortened and the cross section of the path is considerably lengthened. The resistance to propogation is therefore initially decreased as is the initial internal resistance $R_i$ at the cell. When this latter arrangement is operated in the same manner as the fuel cell described in connection with Fig. 1, the initial current density is much larger than the initial current density using the embodiment of Fig. 1. During the period of operation, the current density, however, drops more and more with time. If the electrodes 2 and 3 are again removed and replaced in the arrangement corresponding to Fig. 1, and operation is again resumed, then the current strength measured is lower than the one initially measured when initially starting with the arrangement of Fig. 1. The decrease in the current of the cell is found to be directly connected with a decrease in the activity of the fuel electrode 3 caused by a direct oxidation of the active nickel in the double skeleton electrode caused by contact with small oxygen bubbles emerging in an unionized state through fine holes, cracks or pores of more than average size in the oxygen electrode 2.

In the case of the U-tube arrangement shown in Fig. 1, the fuel electrode 3 was protected from this direct oxygen attack because of the small gas bubbles due to their lower specific gravity were only able to rise in the electrolyte but could not descend through the U-tube to reach the fuel electrode.

The experiment was repeated using, however, the fuel cell as shown in Fig. 2 with a fine mesh wire gauze 6 as shown inserted between the electrodes. The electrodes and the conditions of operation were otherwise identical as described in connection with the previous embodiment. The initial current density upon operation of the fuel cell was higher than with the arrangement as shown in Fig. 1 and as high as the initial current density when the two electrodes were placed side by side in the container without the wire mesh. During the period of operation, however, the decrease in the current density which occurred in the absence of the wire mesh 6 did not occur and the initial high current density was retained throughout the operational period.

It was found that the oxygen potential of the oxygen electrode could establish at the nickel screen with no substantial energy consuming potential differences occurring between these elements. This is highly favorable inasmuch as nickel is the cheapest of the alkali resistant metals but would not normally suggest itself for this purpose inasmuch as the fuel electrode is also made of nickel. The hydrogen potential, however, will establish due to the difference in the catalytic activity between the fuel electrode and the nickel wire. It is found also possible to use other metallic wire gauzes or porous metal bodies all of which exhibit the advantage due to their good electric conductivity, of not markedly increasing the resistance to propagation in contrast to well known porous ceramic bodies of ordinary ceramic cells. If an extremely low resistance to propagation is not essential, then porous bodies or gauzes of non-metallic material such as plastics as, for example, polyamides or polystyrenes may be used.

While the invention has been described in detail with reference to the specific embodiments shown, various changes and modifications will become apparent to the skilled artisan which fall within the spirit of the invention and scope of the appended claims.

We claim:

1. In a fuel cell for the direct production of electrical energy from a fluid fuel and an oxidizing gas, having a porous fuel electrode and a porous oxygen electrode for the adsorption and de-adsorption as ions of fuel and oxygen, respectively spaced apart in a liquid electrolyte bath, the improvement which comprises a partition having multiple openings of less than 1 millimeter size defined therethrough positioned in the electrolyte bath separating the oxygen electrode from the fuel electrode to prevent oxygen bubbles emerging from the oxygen electrode from contacting the fuel electrode.

2. Improvement according to claim 1 in which said partition is of electrically conductive material.

3. Improvement according to claim 2 in which said partition is in the form of a fine mesh wire gauze.

4. Improvement according to claim 3 in which said partition is in the form of a fine mesh nickel gauze.

5. Improvement according to claim 1 in which said partition is of a non-conductive material.

6. Improvement according to claim 5 in which said partition is in the form of a synthetic plastic gauze.

7. Improvement according to claim 1 in which the oxygen electrode is in the form of a hollow shaped carbon body having an average pore diameter of 10 to 100 Angstrom units and an inner surface area of between 10 and 50 meters per gram.

8. Improvement according to claim 7 in which a fuel electrode is a hydrogen electrode consisting of a skeleton with metallic conductivity serving as a carrier and having embedded therein 20 to 80% by weight of Raney catalyst granules.

9. Improvement according to claim 1 in which said fuel electrode is a hydrogen electrode consisting of a skeleton having metallic conductivity and serving as a carrier with 20 to 80% by weight of Raney catalyst skeleton granules embedded therein.

10. In the process for the direct production of electrical energy from fluid fuels and an oxidizing gas in which a porous fuel electrode and a porous oxygen electrode for the adsorption and de-adsorption as ions of fuel and oxygen, respectively are maintained spaced apart in a liquid electrolyte with an oxidizing gas being passed through the oxygen electrode and a fluid fuel maintained in contact with a fuel electrode, the improvement which comprises maintaining the fuel electrodes substantially free from contact with gas bubbles emerging from the oxygen electrode by maintaining a partition having openings of less than about 1 mm. size defined therethrough in the electrolyte between the fuel electrode and oxygen electrode.

11. Improvement according to claim 10 in which said partition is in the form of a fine mesh wire gauze.

12. Improvement according to claim 11 in which said wire gauze is a metallic wire gauze.

13. Improvement according to claim 12 in which said wire gauze is a nickel gauze.

14. Improvement according to claim 13 in which said oxygen electrode is a hollow shaped porous carbon body having an average pore diameter of 10 to 100 Angstrom units and an inner surface area of 10 to 50 square meters per gram.

15. Improvement according to claim 14 in which said fuel electrode is a gas electrode consisting of a skeleton having metallic conduction and serving as a carrier with 20 to 80% by weight of Raney catalyst skeleton granules embedded therein.

16. Improvement according to claim 10 in which said oxygen electrode is a hollow shaped porous carbon electrode having an average pore diameter of 10 to 100

Angstrom units and an inner surface area of 10 to 50 square meters.

17. Improvement according to claim 16 in which said fuel electrode is a hydrogen electrode consisting of a skeleton with metallic conduction serving as a carrier and having 20 to 80% by weight of Raney catalyst skeleton granules embedded therein.

18. Improvement according to claim 10 in which said fuel electrode is a hydrogen electrode consisting of a skeleton with metallic conduction serving as a carrier and having 20 to 80% by weight of Raney catalyst skeleton granules embedded therein.

References Cited in the file of this patent

UNITED STATES PATENTS

| | | |
|---|---|---|
| 567,721 | Payson | Sept. 15, 1896 |
| 1,716,461 | Portail | June 11, 1929 |
| 2,620,371 | Bowditch | Dec. 2, 1952 |

FOREIGN PATENTS

| | | |
|---|---|---|
| 345,118 | France | Nov. 22, 1904 |
| 4,921 of 1882 | Great Britain | Oct. 16, 1882 |
| 667,298 | Great Britain | Feb. 27, 1952 |